United States Patent [19]

Gleason et al.

[11] Patent Number: 4,559,377

[45] Date of Patent: Dec. 17, 1985

[54] CEILING BOARD EDGE COATING

[75] Inventors: James R. Gleason; Roy E. Shaffer, both of Newark, Ohio; Issac A. Awabdy, Meridian, Miss.

[73] Assignee: Owens-Corning Fiberglas Corporation, Toledo, Ohio

[21] Appl. No.: 604,676

[22] Filed: Apr. 27, 1984

[51] Int. Cl.[4] .............................................. C08L 1/28
[52] U.S. Cl. ...................................... 524/44; 524/413; 524/425; 524/445; 524/449; 524/450
[58] Field of Search ................... 524/43, 44, 413, 425, 524/445, 446, 447, 449, 450; 427/284, 285

[56] References Cited

U.S. PATENT DOCUMENTS

| 3,554,942 | 1/1971 | Zdanowski et al. | 524/44 |
|---|---|---|---|
| 3,632,383 | 1/1972 | Dominick et al. | 427/285 |
| 3,835,074 | 9/1974 | Desmarais | 524/44 |
| 4,051,306 | 9/1977 | Tobias et al. | 524/44 |
| 4,230,844 | 10/1980 | Chang et al. | 524/522 |

FOREIGN PATENT DOCUMENTS 8174450 10/1983 Japan ..................................... 524/44

Primary Examiner—John Kight
Assistant Examiner—Nathan M. Nutter
Attorney, Agent, or Firm—Ronald C. Hudgens; Ted C. Gillespie; Debra L. Pawl

[57] ABSTRACT

An edging compound for ceiling tile comprises a hydroxyethyl cellulose, an acrylic latex, a polypropylene and one or more particulate fillers.

9 Claims, No Drawings

CEILING BOARD EDGE COATING

This invention relates to a ceiling board edge coating. In one of its more specific aspects this invention relates to a non-cracking composition applicable to the edges of ceiling boards.

BACKGROUND OF THE INVENTION

The use of ceiling boards, or tile, is well known. Such boards can be made of any suitable material. Those containing glass fibers and having a surface coating find wide usage. Frequently, such boards are supported on gridwork. Certain boards so supported drop slightly below the gridwork so that the edge retained on the gridwork, which edge is thinner than the board proper, is exposed.

In order to provide a finished appearance to such edges, it has been customary to apply an edge coating. However, such coatings frequently are susceptible to voids and cracking and tend to "wick" into, or be absorbed by, the basic material of the board. To prevent this, multiple pass coating has been resorted to in addition to, in some instances, oven drying.

The ceiling board edge coatings of this invention avoid such difficulties and do not require oven drying or special application procedures.

STATEMENT OF THE INVENTION

According to this invention there is provided a coating comprising a hydroxyethyl cellulose, an acrylic latex, a polypropylene and at least one particulate filler.

In the preferred embodiment of the invention, the coating will include an aluminum silicate and a coalescing agent.

DETAILED DESCRIPTION OF THE INVENTION

Any suitable hydroxyethyl cellulose (HEC) can be employed. Preferably, the HEC will have a hydroxyethyl molar substitution value of about 2.5, a viscosity (1% solution) of between about 1500 and about 2500 cps and have a mean average molecular weight within the range of from about 1 mm to about 1.5 mm.

One particularly suitable HEC is Natrosol 250 HR obatinable from Hercules, Wilmington, Del.

The HEC will be contained in the composition in an amount within the range of from about 0.01 to about 0.3 weight percent, preferably in an amount of about 0.10 weight percent.

Any suitable acrylic latex can be employed. Preferably the acrylic latex will have a mean average molecular weight within the range of from about 1 to about 1.5 mm.

One suitable acrylic latex is AC-22 available from Rohm & Haas, Philadelphia, Pa.

The acrylic latex will be contained in the composition in an amount within the range of from about 10 to about 30 weight percent, preferably in an amount of about 15.3 weight percent.

Any suitable polypropylene can be employed. Preferably, the polypropylene will have about a 35 micron mean particle size, a specific gravity of about 0.9, a bulking value of about 0.133 gal/lb and a melting point of about 333° F.

One suitable polypropylene texturizing agent is Hercoflat 135 available from Hercules.

The polypropylene will be contained in the composition in an amount within the range of from about 5 to about 25 weight percent, preferably in an amount of about 11.7 weight percent.

In addition, the coating will comprise one or more particulate fillers selected from the group consisting of clay, such as 200–300 mesh smectite clay with long chain organic compounds bounded to its face, such as organic modified hectarite clay, calcium carbonate having a particle size up to 12 microns, mica of about 325 mesh, titanium dioxide of about 0.25 micron and calcium aluminum silicate. These will be contained in amounts of about 20 to 40 weight percent of clay, preferably about 25 weight percent, about 2 to about 15 weight of calcium carbonate preferably about 5 weight percent, about 1 to about 5 weight percent titanium dioxide, preferably about 1.2 weight percent and from about 3 to about 7 weight percent mica, preferably about 2.8 weight percent and about 4 to about 20 weight percent calcium aluminum silicate, preferably about 5 weight percent.

Also, the composite can contain a dispersant such as the sodium salt of acrylic acid, a coalesing agent and a defoamer, preferably comprising a blend of mineral oils and non-ionic surfactants.

EXAMPLE

The composition of this invention was prepared in the following manner:

The following material was placed in a mixer, based on the total weight of the final mixture.

|  | Weight Percent |
| --- | --- |
| Water | 20.4 |
| Dispersant | 0.76 |
| Clay | 25.0 |
| Calcium Carbonate | 5.0 |
| Calcium Aluminum Silicate | 5.0 |
| Mica | 2.81 |
| Titanium Dioxide | 1.17 |
| Hydroxyethyl cellulose | 0.10 |

This mixture was ground at 2800 FPM for 20 minutes using a Cowls mixing blade.

Thereafter the following materials were added during low speed agitation:

|  | Weight Percent |
| --- | --- |
| Acrylic latex | 15.3 |
| Coalescing Agent | 0.2 |
| Defoamer | 0.2 |
| Hydroxyethyl cellulose | 0.6 |
| Ammonium Hydroxide | 0.1 |
| Polypropylene Agent | 11.7 |

The mixture was agitated for about 5 minutes until thickened to a suitable viscosity.

The mixture can be applied to the edges to be coated in any suitable manner including brushing, by continuous applications and the like. Preferably, it will be applied at an application rate of up to about 8 grams per linear foot of edging.

It can be applied through a small orifice nozzle and subsequently wiped smooth while still wet with an appropriate thin metal blade.

Thereafter, the material is air dried.

It will be evident from the foregoing that various modifications can be made to this invention. Such, however, are considered within the scope of the invention.

We claim:

1. A composition comprising hydroxyethyl cellulose, an acrylic latex, a polypropylene and at least one particulate filler selected from the group consisting of clay, calcium carbonate, mica, titanium dioxide and calcium aluminum silicate.

2. The composition of claim 1 in which said hydroxyethyl cellulose has a hydroxyethyl molar substitution value of about 2.5.

3. The composition of claim 1 in which said acrylic latex has a mean average molecular weight within the range of from about 1 to about 1.5 million.

4. The composition of claim 1 in which said polypropylene has a melting point of about 333° F.

5. The composition of claim 1 including a dispersant, a coalescing agent and a surfactant.

6. The composition of claim 1 comprising from about 0.01 to about 0.3 weight percent hydroxyethyl cellulose, about 10 to about 30 weight percent acrylic latex from about 5 to about 25 weight percent polypropylene.

7. The composition of claim 1 comprising about 0.1 weight percent hydroxyethyl cellulose, about 15.3 weight percent acrylic latex and about 11.7 weight percent polypropylene.

8. The composition of claim 1 comprising a dispersant, a coalescing agent and a surfactant.

9. A method of preparing a composition comprising mixing in parts by weight about 20 parts water, 0.8 parts dispersant, 25 parts clay, about 5 parts calcium aluminum silicate, about 2.8 parts mica, about 1.2 parts titanium dioxide and about 0.1 part hydroxyethyl cellulose to form a mixture and adding to the mixture while agitating, in parts by weight, about 15.3 parts acrylic latex, about 0.2 part of coalescing agent, about 0.2 part of a defoamer, about 0.6 part hydroxyethyl cellulose, about 11.6 part water, about 0.2 part ammonium hydroxide and about 11.7 parts polypropylene.

* * * * *